US009399172B2

(12) United States Patent
Haberman

(10) Patent No.: US 9,399,172 B2
(45) Date of Patent: Jul. 26, 2016

(54) MECHANISM FOR ALLOWING A NUMBER OF SPLIT-SCREENS TO SHARE A DISPLAY ON A CLIENT DEVICE BEYOND AN APPLICATION'S NATIVE CAPACITY FOR SPLIT-SCREENING

(71) Applicant: Google Inc., Mountain View, CA (US)

(72) Inventor: Ron Efraim Haberman, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 293 days.

(21) Appl. No.: 14/220,006

(22) Filed: Mar. 19, 2014

(65) Prior Publication Data
US 2014/0349748 A1 Nov. 27, 2014

Related U.S. Application Data

(60) Provisional application No. 61/827,137, filed on May 24, 2013.

(51) Int. Cl.
A63F 13/00 (2014.01)
A63F 13/355 (2014.01)
A63F 13/5252 (2014.01)
A63F 13/77 (2014.01)
A63F 13/86 (2014.01)

(52) U.S. Cl.
CPC .......... *A63F 13/355* (2014.09); *A63F 13/5252* (2014.09); *A63F 13/77* (2014.09); *A63F 13/86* (2014.09)

(58) Field of Classification Search
CPC .............................. A63F 13/12; A63F 13/5252
USPC ........................................................ 463/34
See application file for complete search history.

(56) References Cited

U.S. PATENT DOCUMENTS

| | | | | |
|---|---|---|---|---|
| 2002/0183105 | A1* | 12/2002 | Cannon | G07F 17/32 463/16 |
| 2003/0083943 | A1* | 5/2003 | Adams | G06Q 30/02 705/14.23 |
| 2004/0072619 | A1* | 4/2004 | Brosnan | G07F 17/3262 463/42 |

* cited by examiner

*Primary Examiner* — Reginald Renwick

(57) ABSTRACT

A method for allowing a number of split-screens to share a display on a client device beyond an application's native capacity for split-screening, includes determining configuration parameters for the client device, establishing a plurality of application instances to be initialized based on the number of split-screens and the application's native capacity for split-screening, initializing one or more virtual machine servers to service the plurality of application instances, optimizing display output parameters for each application instance based at least in part on the configuration parameters for the client device, and outputting display from each application instance to the client device, such that the display output from each application instance shares the display on the client device.

27 Claims, 8 Drawing Sheets

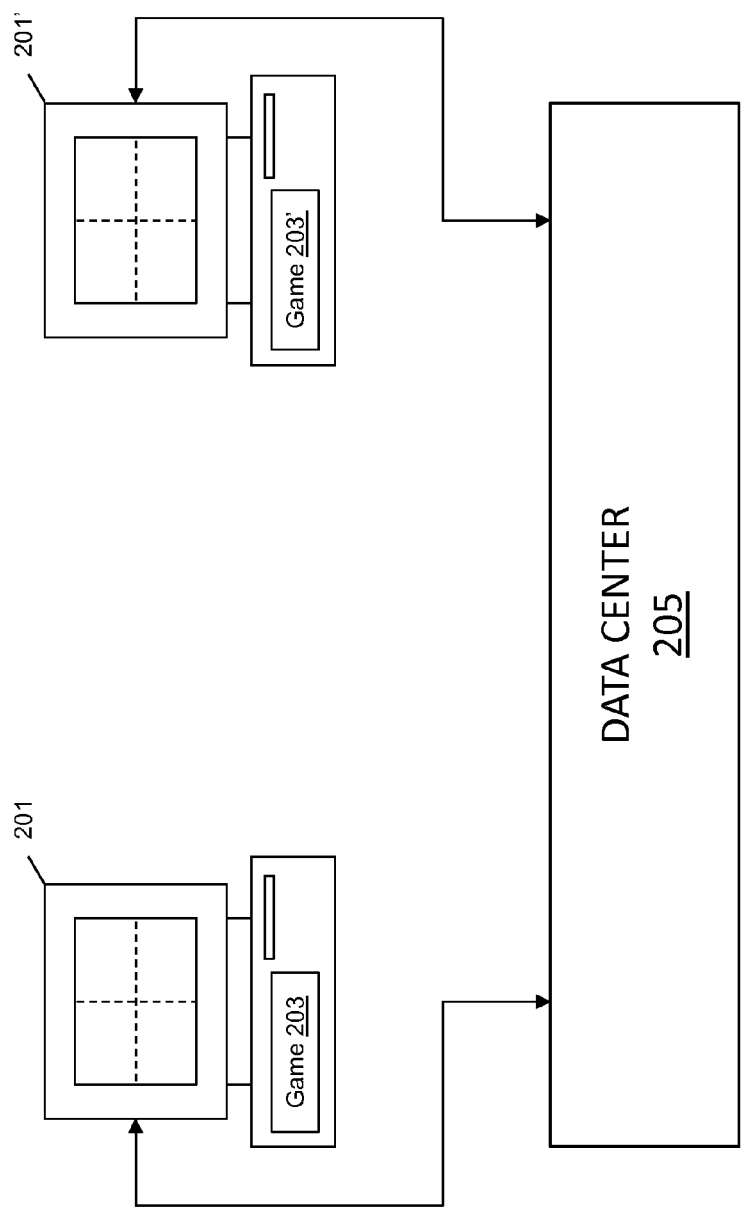

MECHANISM FOR ALLOWING A NUMBER OF SPLIT-SCREENS TO SHARE A DISPLAY ON A CLIENT DEVICE BEYOND AN APPLICATION'S NATIVE CAPACITY FOR SPLIT-SCREENING

CROSS-REFERENCE TO RELATED APPLICATIONS

The present application claims the benefit of U.S. Provisional Patent Application No. 61/827,137, filed on May 24, 2013, which is hereby incorporated by reference in its entirety.

FIELD OF THE INVENTION

This invention relates to the field of remote transmission of applications, and in particular to a mechanism for allowing a number of split-screens to share a display on a client device beyond an application's native capacity for split-screening.

BACKGROUND

Remote transmission of applications from a server to a client device is often used in the context of gaming. For a multiplayer gaming environment, several client devices may interact with each other in the same gaming environment through a data center (e.g., game server). The data center is connected to each of the client devices over a network and services gameplay for the different client devices by managing input and output for the client devices. For example, an explosion occurring in the gaming environment at one client device may be utilized by the data center to determine what is displayed on another client device (e.g., remnants from the explosion).

For certain multiplayer games, the native capacity of a game running at a client device may only allow for a certain number of split-screens to share the display of that client device. In other words, a single game instance running on a single client device may only support the shared display of a maximum number of split-screens. Any additional split-screens wishing to share the display of the client device are not allowed to do so. Instead, additional screens beyond the maximum number desiring to interact in the same multi-player gaming environment must be realized by running an additional game instance on a different client device. This is due to the fact that each game instance requires a certain amount of resources to operate, and extending the number of split-screens sharing a display at a client device beyond the maximum allowable number of split-screens would create strain on the resources of the client device, leading to inefficient and sub-optimal gameplay.

Take a multi-player first person shooter for example. Each client device running an instance of the first person shooter game may realize that the game instance only has the native capacity to allow for a maximum of four split screens to share a display on a single client device. Thus, each client device may only allow for a maximum of four different players to play using that client device at a time. Additional screens (e.g., additional players) wishing to join the multiplayer environment must be realized on a different client device.

However, situations often arise where it may be desirable to have a number of split-screens greater than that allowed by the native capacity of the game to share the display on a single client device. Therefore, there is a need for a mechanism to allow a number of split-screens to share a display on a client device beyond an application's native capacity for split-screening.

SUMMARY

Embodiments of the invention concern a mechanism for split-screening of applications beyond their native capacity to split-screen.

Further details of aspects, objects and advantages of the invention are described below in the detailed description, drawings and claims. Both the foregoing general description and the following detailed description are exemplary and explanatory, and are not intended to be limiting as to the scope of the invention.

BRIEF DESCRIPTION OF THE DRAWINGS

The drawings illustrate the design and utility of embodiments of the present invention, in which similar elements are referred to by common reference numerals. In order to better appreciate the advantages and objects of embodiments of the invention, reference should be made to the accompanying drawings. However, the drawings depict only certain embodiments of the invention, and should not be taken as limiting the scope of the invention.

FIG. 2B illustrates another example multi-player game environment.

DETAILED DESCRIPTION

Various embodiments are described hereinafter with reference to the figures. It should be noted that the figures are not necessarily drawn to scale. It should also be noted that the figures are only intended to facilitate the description of the embodiments, and are not intended as an exhaustive description of the invention or as a limitation on the scope of the invention. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments", in various places throughout this specification are not necessarily referring to the same embodiment or embodiments.

According to some embodiments, a mechanism is provided for allowing a number of split-screens to share a display at a client device beyond the number of split-screens supported by the native capacity of a game. In this way, a number split-screens greater than that allowed by the native capacity of a game may be realized (e.g., displayed) on a single client device such that players may interact in a multiplayer game environment using the single client device rather than having to use multiple client devices.

Figure 1:
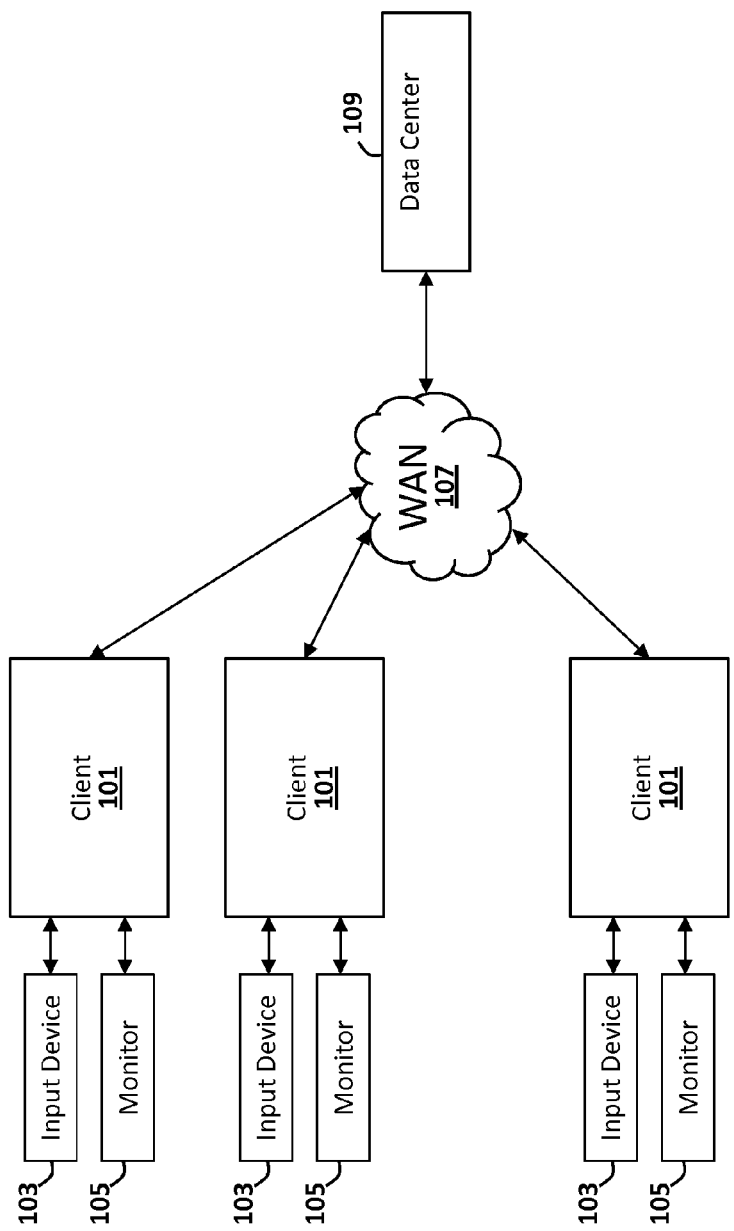
FIG. 1 illustrates an example client-server architecture.

Multiplayer gaming environments are typically realized using a client-server architecture. FIG. 1 illustrates an example client-server architecture 100. A plurality of client devices 101 (e.g., gaming consoles) are connected to a data center 109 (e.g., server) over a wide are network (WAN) 107. Each client device 101 may include an input device 103 and a monitor 105. Such input devices may include keyboards, joysticks, game controllers, motion sensors, touchpads, etc.

Conventionally, each client device 101 runs a game instance 111 locally. The users at each client device 101 interact in a multiplayer environment via the data center 109. The data center 109 manages the input/output of each client device 101 to create the multiplayer gaming environment. The data center 109 may monitor the gaming context of a game instance 111 running at a first client device 101 and utilize that gaming context to create and maintain the gaming context for a game instance 111 running at another client device 101. The data center 109 does this by creating a global environment for all client devices 101 interacting in the multi-player environment by monitoring the local environment for each individual client device 101 and utilizing the local environment of each individual client device 101 to accurately create the local environment for every other client device 101 in the multi-player environment.

An example of a multi-player interaction between client devices 101 via the data center 109 may involve an explosion occurring in the local gaming environment of one client device 101 being utilized by the data center 109 to determine how residue from the explosion is displayed in the local gaming environment of another client device 101.

For certain multiplayer games, each game instance 111 running at a client device 101 may only have the native capacity to allow for a certain maximum number of split-screens to share the display 105 of that single client device 101 due to the resource consumption required by the game instance 111. As used herein, the term split-screens refers to the number of screens (e.g., partitions) being simultaneously displayed at a client device. Any additional split-screens wishing to share the display of the client device are not allowed to do so. Instead, additional screens beyond the maximum number desiring to interact in the same multi-player gaming environment must be realized on a different client device.

Figure 2A:
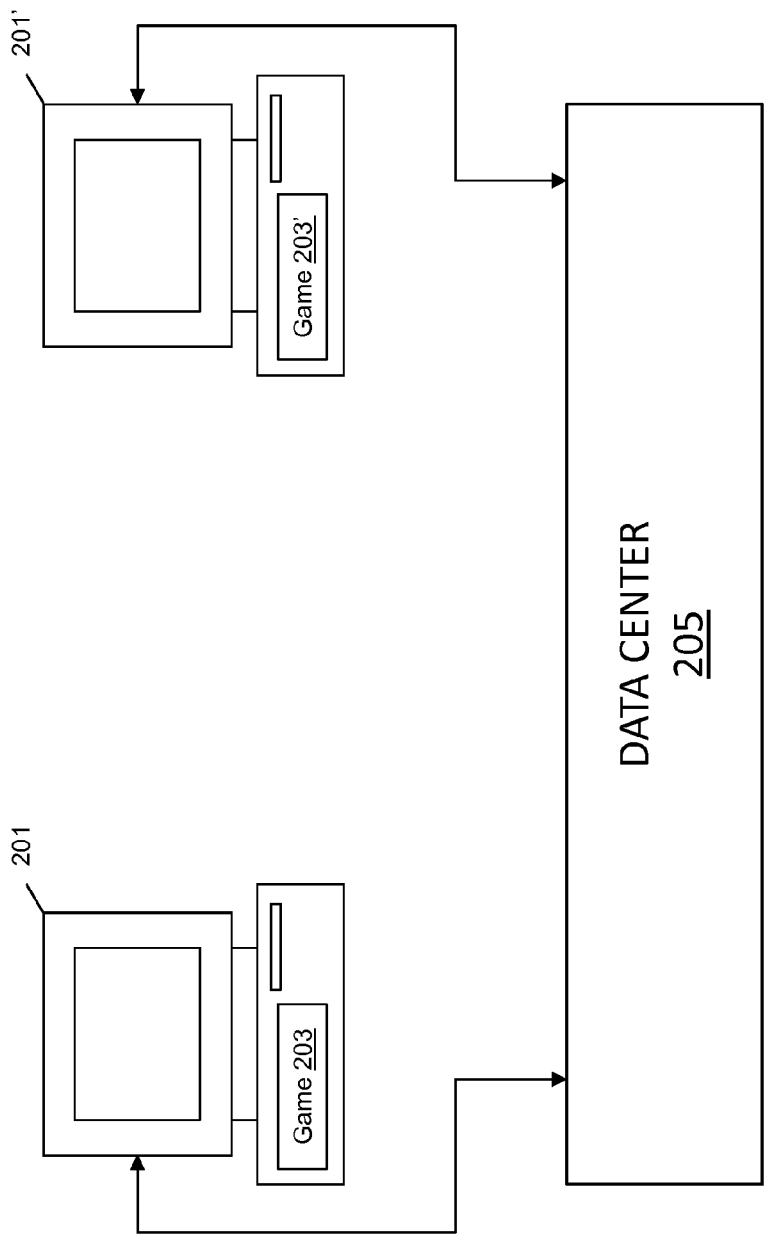
FIG. 2A illustrates an example multi-player game environment.

FIG. 2A illustrates an example of a multi-player game environment, wherein the native capacity of a game instance at a client device only allows for a single screen to share the display of that client device. For purposes of example, only two client devices 201, 201' interacting in a multi-player game environment will be illustrated, however one ordinarily skilled in the art will recognize that the similar issues will arise for various multi-player game environments having any number of client devices where the native capacity of a game instance only allows for a certain maximum number of split-screens to share the display of a client device.

In FIG. 2A, a first client device 201 running a first game instance 203 and a second client device 201' running a second game instance 203' interact with a data center 205 which manages a multi-player gaming environment for the client devices 201, 201'. As discussed above, the data center 205 monitors the gaming context of the first game instance 201 running at the first client device 201 and utilizes that gaming context to create and maintain the gaming context displayed for the second game instance 203' running at the second client device 201'. At the same time, the data center 209 also monitors the gaming context of the second game instance 203' running at the second client device 201' and utilizes that gaming context to create and maintain the gaming context displayed for the second game instance 203' running at the second client device 201'.

In the example illustrated in FIG. 2A, each game instance 203, 203' running on a client device 201, 201' has the native capacity to allow for only a single screen to share the display of the client device 201, 201'. In other words, each game instance 203, 203' may only support a maximum of one screen to be displayed at a single client device 201, 201'. This is due to the fact that the game instance 203, 203' requires a certain amount of resources to operate. Extending the number of split-screens sharing the display at a client device 201, 201' beyond the maximum allowable number of split-screens allowed by the native capacity of the game instance would create strain on the resources of the client device 201, 201', leading to inefficient and sub-optimal gameplay. Thus, in order to ensure that each client device 201, 201' is optimally running its game instance 203, 203' for the multi-player environment 200, each client device 201, 201' is limited to allowing only a single screen to be displayed for its game instance 203, 203'.

In this situation, any additional split screens wishing to share the display of a client device 201, 201' are not allowed to do so. Instead, any additional split screens beyond the maximum split screens allowed by the native capacity of a game instance must be realized using an additional client device.

While the native capacity of the game in FIG. 2A allows for only a single screen to be utilized by a client device, some games may have the native capacity to allow for a greater maximum number of split screens to be utilized for a client device.

FIG. 2B illustrates an example of a multi-player game, wherein a game instance running on a client device only allows for a maximum of four split-screens to share the display of a client device. Each game instance 203, 203' running on a client device 201, 201' in FIG. 2B has the native capacity to allow for a maximum of four split-screens to simultaneously share the display of the client device 201, 201'. This is due to the fact that each game instance 203, 203' requires a certain amount of resources to operate, and extending the number of split-screens sharing the display at a client device 201, 201' beyond the maximum allowable number of split-screens allowed for by the native capacity of a game instance 203, 203' would create strain on the resources of the client device 201, 201', leading to inefficient and sub-optimal gameplay. Thus, in order to ensure that each client device 201, 201' is optimally running its game instance 203, 203' for the multi-player environment, each client device 201, 201' is limited to allowing only four split-screens to share its display simultaneously for its game instance 203, 203'.

In this situation, any additional split screens beyond the maximum number of split screens allowed to share the display of a client device due to the native capacity of a game instance must be realized using an additional client device.

Although multi-player gaming environments may be effectively created where games have the native capacity to support shared display of only a certain maximum number of split-screens on a single client device, situations often arise where it may be desirable to have a number of split-screens share the display of a single client device greater than that allowed by the native capacity of the game. For example, two players wishing to interact in a multi-player gaming environment using split-screens on a single client device, may realize that they cannot do so because the native capacity of the game that they are running only allows for a maximum of a single screen to share the display of that client device. In this situation, the two players can only interact in a multi-player environment by using two different client devices running two separate game instances.

With the introduction of remote content delivery and virtualization, the resources needed to run a game instance for a client device may be significantly reduced. The concept of remote content delivery allows for game instances to instead be run at the data center and game data to be transmitted remotely to the client device. Various mechanisms for generating game data at a data center (e.g., server) and transmitting the game data remotely to the client device exist. For example, remote graphics rendering allows for graphics (e.g., pixels) associated with a game to be rendered at the data center and remotely transmitted to the client device for display. Further details regarding methods and mechanisms for implementing remote content delivery are described in: co-pending application Ser. No. 13/234,948, entitled "Method and Mechanism for Delivering Applications over a WAN"; co-pending application Ser. No. 13/349,422, entitled "Method and Mechanism for Performing Both Server-Side and Client-Side Rendering of Visual Data"; co-pending application Ser. No. 13/491,930, entitled "Method and Mechanism for Performing Both Server-Side and Client-Side Rendering of Visual Data"; and co-pending application Ser. No. 13/558,163, entitled "Method and Mechanism for Efficiently Delivering Visual Data Across a Network", which are hereby incorporated by reference in their entirety.

Figure 3:
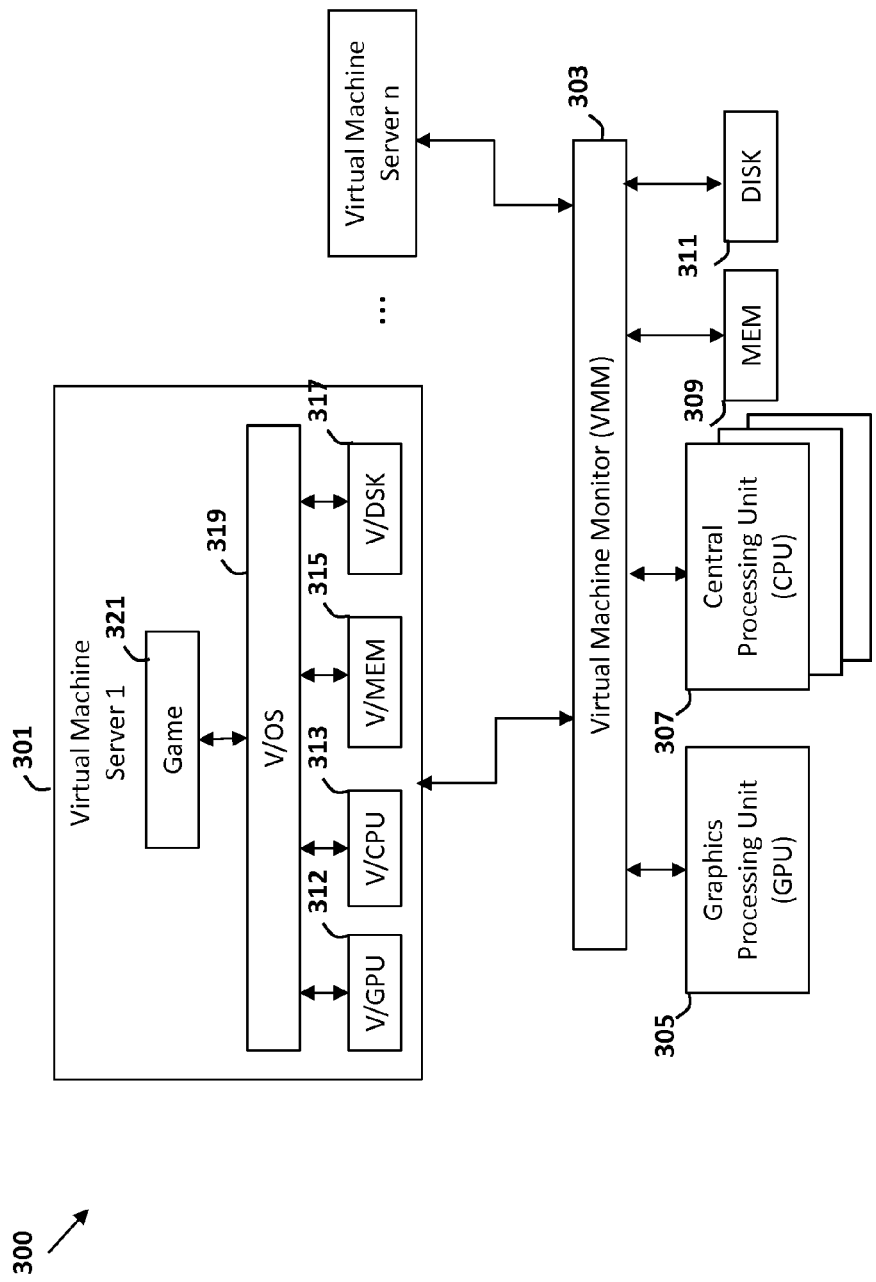
FIG. 3 illustrates an example virtualization environment for a data center which may be used to service client devices interacting in a multi-player gaming environment according to some embodiments.

Additionally, the concept of virtualization allows for the resources of a data center to be virtualized and utilized by virtual machines to remotely service client devices, such that the resources at the client device needed to maintain game functionality may be significantly reduced. FIG. 3 illustrates an example virtualization environment for a data center which may be used to service client devices interacting in a multi-player gaming environment. The data center 300 utilizes a plurality of virtual machine servers 301 to run game instances 321 for remotely servicing gameplay for client devices (not shown). As is well known in the field of computer science, a virtual machine is a software abstraction—a "virtualization" of an actual computer system.

The data center 300 of FIG. 3, includes an underlying hardware system comprising a hardware processor (e.g., CPU) 307, a graphics processor (e.g., GPU) 305, a memory #09, and a storage device which will typically be a disk 311. The memory 309 will typically be some form of high-speed RAM, whereas the disk 311 will typically be a non-volatile, mass storage device.

Each virtual machine server 301 will typically include a virtual GPU 312, virtual CPU 313, a virtual memory 315, a virtual disk 317, a virtual operating system 319, and a game instance 321. All of the components of the virtual machine server 301 may be implemented in software using known techniques to emulate the corresponding components of the underlying hardware system. The game instance 321 running within a virtual machine server 301 will act just as it would if run on a "real" computer. Executable files will be accessed by the virtual operating system 319 from the virtual disk 317 or virtual memory 315, which will simply be portions of the actual physical disk 311 or memory 309 allocated to that virtual machine server 301.

The virtual machine server 301 may be functionally connected to a virtual machine monitor 303, which is functionally connected to the underlying hardware system. The virtual machine monitor 303 is a thin piece of software that runs directly on top of the hardware system and virtualizes the underlying hardware system. The virtual machine monitor 303 provides an interface that is responsible for executing virtual machine server 301 issued instructions and transferring data to and from the actual memory 309 and storage device 311. The game instance 321 may generate a set of instructions to be executed by either the virtual GPU 312 or the virtual CPU 313, which are conveyed to the underlying GPU 305 and CPU 307 using the virtual machine monitor 303.

Each virtual machine server 301 may run a game instance for a client device (not shown), and the data center may allow for various communications to occur between virtual machine servers and also between virtual machine servers and client devices in order to facilitate remote management and execution of a multi-player gaming environment for the client devices.

While FIG. 3 illustrates an example virtualization environment that may be utilized by a data center to service gameplay for various client devices, it is important to note that other virtualization architectures exist for servicing gameplay for various client devices which may also be employed to implement the mechanism for split-screening of games beyond their native capacity to split-screen. Further details regarding virtualization architectures for data centers are described in co-pending application Ser. No. 13/739,473, entitled "Data Center Architecture for Remote Graphics Rendering" which is hereby incorporated by reference in its entirety.

By utilizing virtual machine servers to run game instances rather than running game instances on client devices, the resource intensive actions needed to operate a game instance may be performed at the data center rather than the client device. Because the client device is no longer bound by the resource intensive actions of operating a game instance, the client device can now be configured to allow for a number of split-screens to share its display beyond the game's native capacity for split screening.

Figure 4:
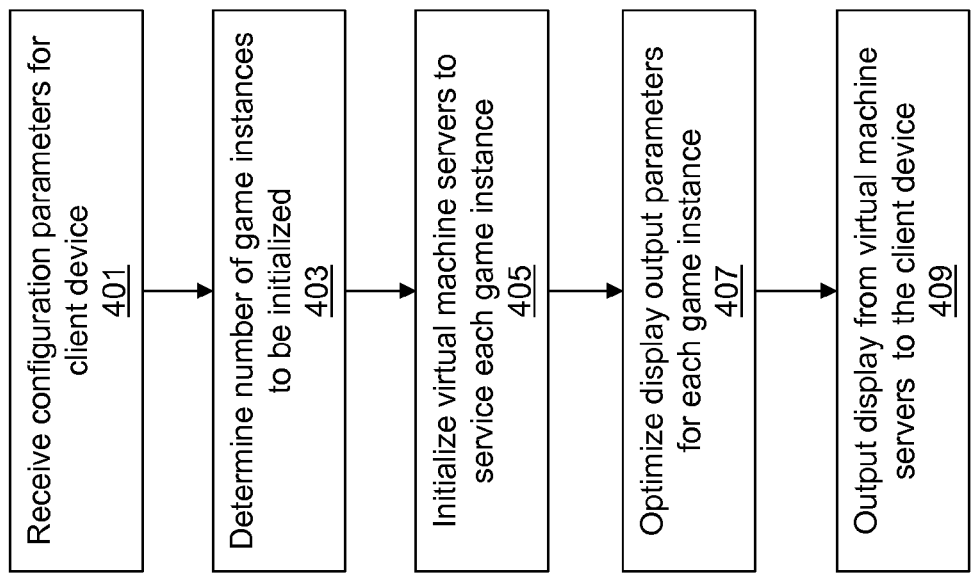
FIG. 4 illustrates a flowchart depicting a method for split-screening of game instances at a client device beyond their native capacity to split-screen in accordance with some embodiments of the invention.

FIG. 4 illustrates a flowchart depicting a method for allowing a number of split-screens to share the display of a client device beyond a game's native capacity to split-screen in accordance with an embodiment of the invention.

Initially, configuration parameters for a client device are received at the data center as shown at 401. Such configuration parameters may include resolution settings and aspect ratios associated with the client device. The configuration parameters allow the data center to determine how split-screens may share a display at the client device. For example, the configuration parameters may allow the data center to determine whether the split-screens should be oriented in a portrait or landscape manner. As another example, the configuration parameters may allow the data center to determine a maximum number of split-screens that may be displayed simultaneously at the client device without negatively impacting users' visual experience. The configuration parameters being received from the client device may also include the number of split-screens being requested for simultaneous display at the client device.

Once the configuration parameters have been received for the client device, the data center may determine a number of game instances to be initialized as shown at 403. The number of game instances to be initialized is based on the number of split-screens being requested by the client device and the maximum number of split-screens allowed by the native capacity of the game. The total number of game instances initialized may be equal to the number of split screens being requested by the client device divided by the maximum number of split-screens allowed by the native capacity of a game. For example, the data center may determine that initialization of four game instances is necessary for a client device wishing to display four split-screens for a game having the native capacity for allowing only a single screen to share a display. As another example, the data center may determine that initialization of four game instances is necessary for a client device wishing to display 16 split-screens for a game having the native capacity for allowing only four split-screens for a display.

The data center then initializes virtual machines to service each game instance as shown at 405. In some embodiments, the data center initializes a single virtual machine server for each game instance. In some other embodiments, the data center initializes a single virtual machine for more than one game instance. Because each virtual machine server has the virtual resources to service one or more game instances, several game instances may be run simultaneously at the data center. The data center may also configure the virtual machine servers to communicate amongst each other and to communicate with the requesting client device to facilitate split-screening. Initializing virtual machines to service each game instance may involve associating each game instance with the requesting client device.

The data center may then optimize display output parameters for each game instance as shown at 407. By optimizing display output parameters for each game instance associated with the client device, the various display outputs associated with each game instance may be combined at the client device to provide for the simultaneous display of a number of split-screens greater than that allowed for by the native capacity of a single game instance.

For example, where the requesting client wishes to display four split-screens for a game having the native capacity for allowing only a single screen to be displayed, each of the four game instances may have their display output parameters optimized to fit in a quadrant on the display of the client device.

In embodiments where each virtual machine server is running a single game instance, the virtual machine servers may optimize a single set of display output parameters. In embodiments where each virtual machine server is running multiple game instances, the virtual machine servers may optimize multiple sets of display output parameters.

The virtual machine servers then simultaneously output their displays to the client device as shown at 409. Because the display output parameters have been configured to allow for multiple game instances to be displayed simultaneously at the client device, a number of split-screens greater than the maximum number of split-screens allowed by the native capacity of the game may share the display at the client device.

Thus, at the data center, multiple game instances are simultaneously managed such that the display output for each initialized game instance may later share the display at the client device thereby allowing the client device to simultaneously display a number of split-screens greater than that allowed for by the native capacity of a single game instance. By eliminating the need to run a single game instance on a single client device, and instead associating multiple game instances running at a data center with a single remote client device, a number of split-screens greater than that allowed by the native capacity of a single game instance may share the display at the client device.

Figure 5A:
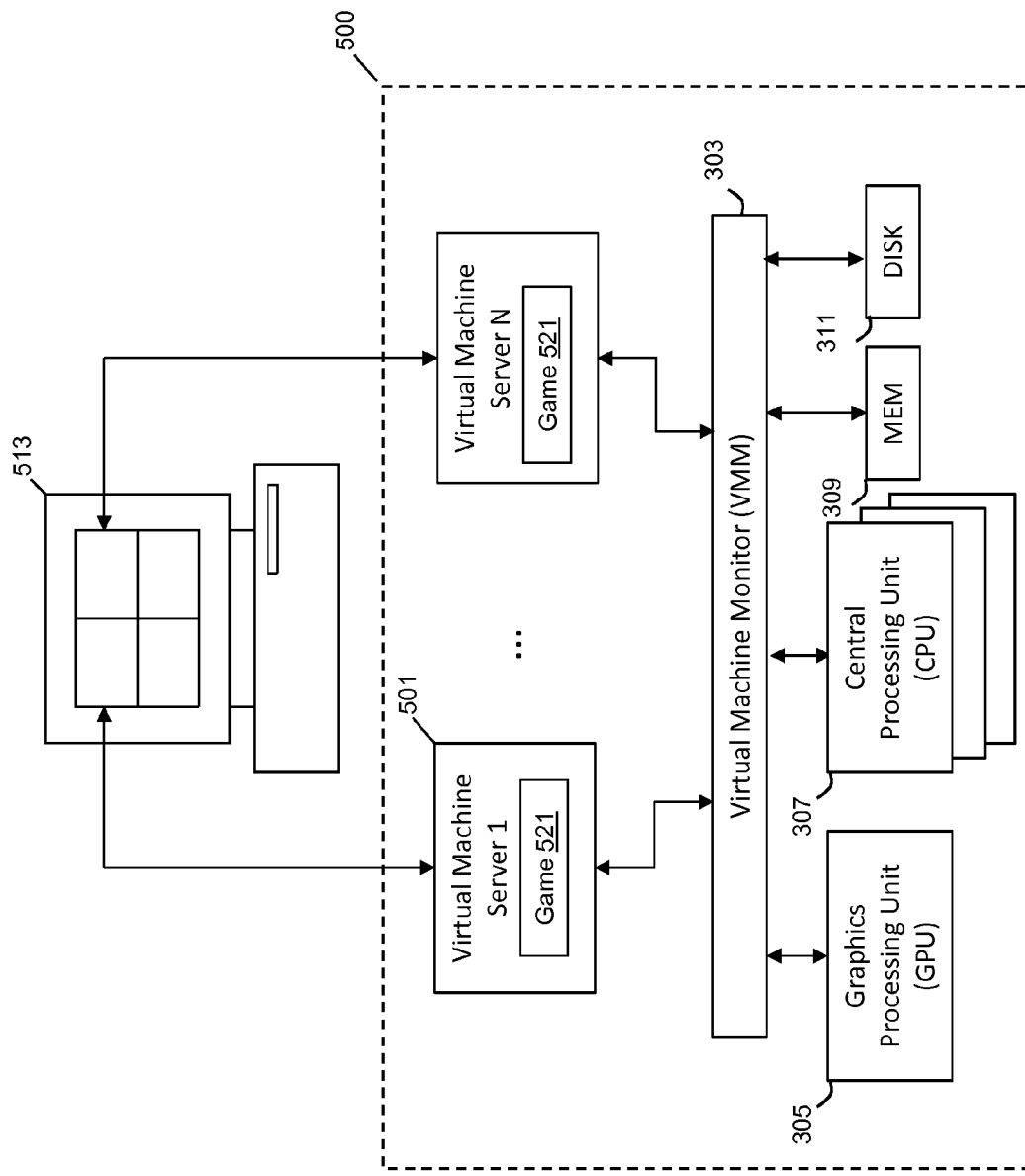
FIG. 5A illustrates an example multi-player environment where a single client device displays a number of split-screens greater than the maximum number of split-screens allowed by the native capacity of a game instance according to some embodiments
Figure 5B:
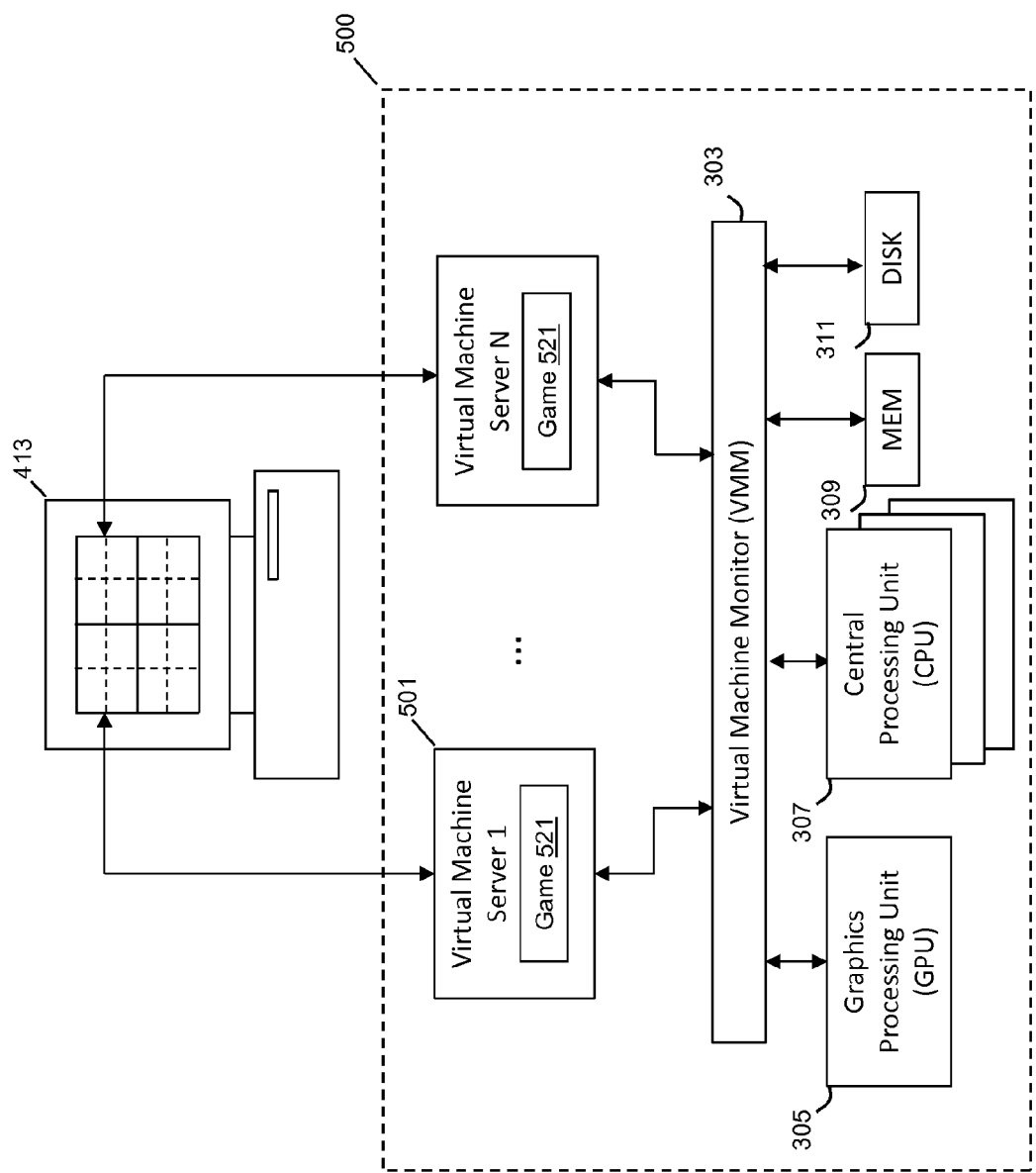
FIG. 5B illustrates an example multi-player environment where a single client device displays a number of split-screens greater than the maximum number of split-screens allowed by the native capacity of a game instance according to some embodiments.

FIGS. 5A and 5B illustrate example multi-player environments where a single client device displays a number of split-screens greater than the maximum number of split-screens allowed by the native capacity of a game. The multi-player environments depicted in FIGS. 5A and 5B include data centers 500, 500' that are substantially similar to the data center 300 depicted in FIG. 3, and so for purposes of simplicity, elements of the data centers 500, 500' in FIGS. 5A and 5B will not be described again in detail.

In FIG. 5A, a single client device 513 is communicating with a data center 500 over a wide area network (not shown). The client device 513 requests for the simultaneous display of four split-screens associated with a game having the native capacity for allowing only a single screen.

The data center 500 determines that four game instances 521 are needed to allow for four split-screens to be simultaneously displayed at the client device 513. The data center 500 then initializes four virtual machine servers 501, each virtual machine server running a single game instance 521. Display output parameters are then optimized for each game instance. For example, each game instance may have its display output parameters optimized to fit in a quadrant on the display of the client device 513.

Each virtual machine server 501 then simultaneously outputs displays for their corresponding game instance to the client device 513 in a manner that allows the client device 513 to simultaneously display four split-screens. A single game instance has the native capacity to only display a single screen at a time. However, by running multiple game instances at a remote data center and associating those multiple game instances with a single client device, the outputs of each of the multiple games instances may be configured to allow for a number of split-screens beyond that allowed by the native capacity of a single game instance to share the display at a single client device.

Another example of a multi-player environment where a single client device displays a number of split-screens greater than the maximum number of split-screens allowed by the native capacity of a game instance is illustrated in FIG. 5B. In FIG. 5B, a single client device 513 is again communicating with a data center 500 over a wide area network (not shown). The client device 513 requests for the simultaneous display of 16 split-screens associated with a game having the native capacity for allowing only four split-screens.

The data center 500 determines that four game instances are needed to allow for sixteen split-screens to be simultaneously displayed at the client device 513. The data center 500 then initializes four virtual machine servers 501, each virtual machine server running a single game instance. Display output parameters are then optimized for each game instance 521. For example, each game instance may have its display output parameters optimized to fit in a quadrant on the display of the client device 513.

Each virtual machine server 501 then simultaneously outputs displays for their corresponding game instance to the client device 513 in a manner that allows the client device 513 to simultaneously display four split-screens. A single game instance has the native capacity to only display a single screen at a time. However, by running multiple game instances at a remote data center and associating those multiple game instances with a single client device, the outputs of each of the multiple games instances may be configured to allow for a number of split-screens beyond that allowed by the native capacity of a single game instance to share the display at a single client device.

While the above embodiments have been described with reference to a gaming context, the mechanism for allowing a number of split-screens to share the display at a client device beyond the game's native capacity to split screen can be applied to various applications having the native capacity to allow for only a certain maximum number of split-screens to share a display at a client device and is not limited to being used for multi-player games.

Similarly, while the mechanism for allowing a number of split-screens to share the display at a client device beyond the game's native capacity to split screen has been described with respect to a single client device, one ordinarily skilled in the art will recognize that the mechanism may be extended to apply for any number of client devices.

System Architecture

Figure 6:
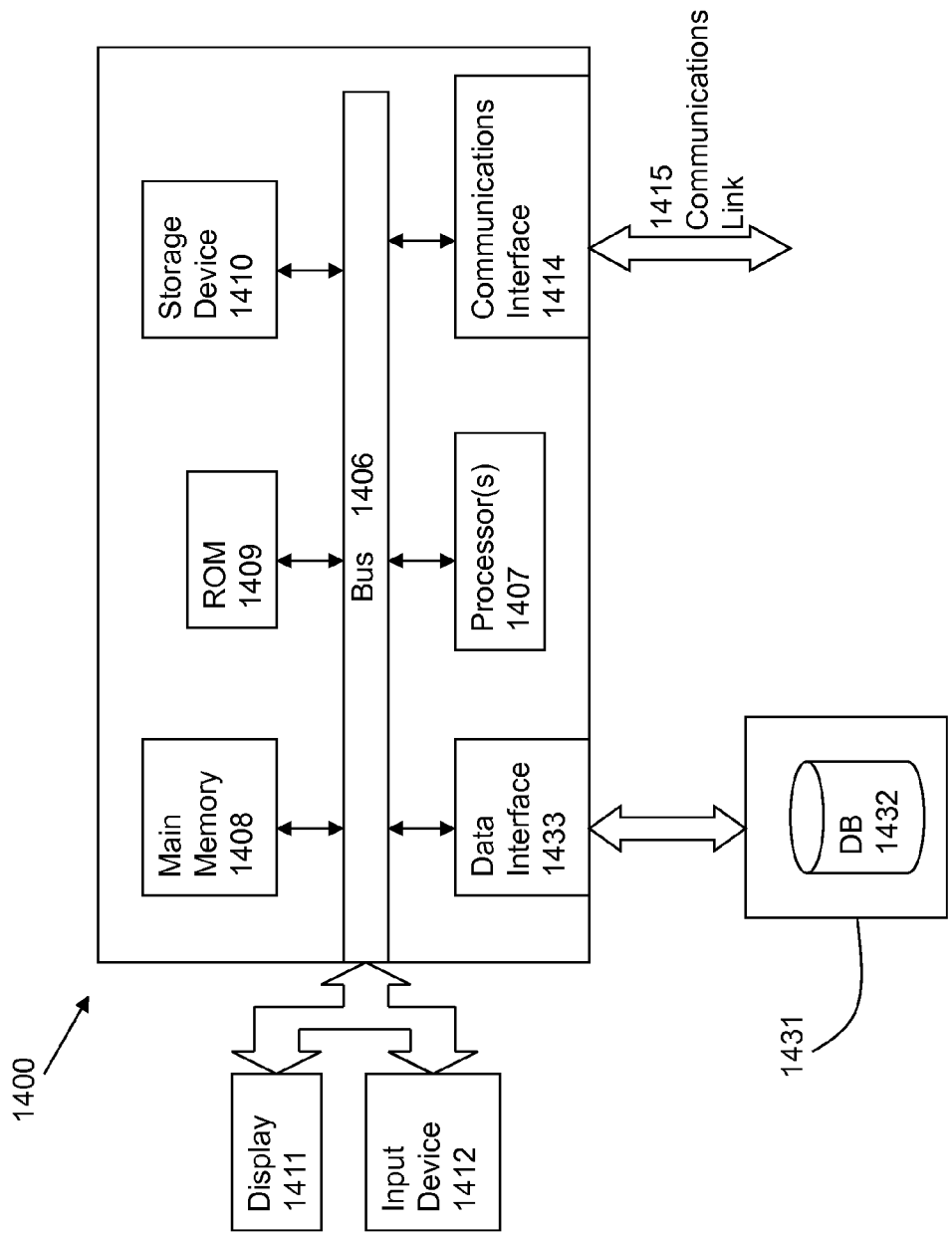
FIG. 6 is a block diagram of an illustrative computing system suitable for implementing some embodiments of the present invention.

FIG. 6 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method for allowing a number of split-screens to share a display on a client device beyond an application's native capacity for split-screening, comprising:
   determining configuration parameters for the client device;
   establishing a plurality of application instances to be initialized based on the number of split-screens and the application's native capacity for split-screening;
   initializing one or more virtual machine servers to service the plurality of application instances;
   optimizing display output parameters for each application instance based at least in part on the configuration parameters for the client device; and
   outputting a display from each application instance to the client device, such that the display output from each application instance shares the display on the client device.

2. The method of claim 1, wherein the configuration parameters include resolution settings or aspect ratios associated with the client device.

3. The method of claim 1, wherein the configuration parameters are utilized to determine how the number of split-screens shares the display at the client device.

4. The method of claim 1, wherein the configuration parameters are utilized to determine whether the number of split-screens should be oriented in a portrait or landscape configuration.

5. The method of claim 1, wherein establishing the plurality of application instances to be initialized is based on the number of split-screens and a maximum number of split-screens allowed by the native capacity of the application.

6. The method of claim 5, wherein the number of application instances to be initialized is established by dividing the number of split screens by the maximum number of split-screens allowed by the native capacity of the application.

7. The method of claim 1, wherein a virtual machine server is initialized for each application instance.

8. The method of claim 1, wherein one virtual machine server is initialized for the plurality of application instances.

9. The method of claim 1, wherein initializing the one or more virtual machine servers comprises configuring the virtual machine servers to communicate amongst each other and communicate with the client device.

10. The method of claim 1, wherein optimizing display output parameters for each application instance comprises configuring display output parameters of each application instance to fit within a portion of the display on the client device.

11. A computer program product embodied on a non-transitory computer readable medium, the computer readable medium having stored thereon a sequence of instructions which, when executed by a processor causes the processor to execute a method for allowing a number of split-screens to share a display on a client device beyond an application's native capacity for split-screening, comprising:
   determining configuration parameters for the client device;
   establishing a plurality of application instances to be initialized based on the number of split-screens and the application's native capacity for split-screening;
   initializing one or more virtual machine servers to service the plurality of application instances;
   optimizing display output parameters for each application instance based at least in part on the configuration parameters for the client device; and
   outputting a display from each application instance to the client device, such that the display output from each application instance shares the display on the client device.

12. The computer program product of claim 11, wherein the configuration parameters include resolution settings or aspect ratios associated with the client device.

13. The computer program product of claim 11, wherein the configuration parameters are utilized to determine how the number of split-screens shares the display at the client device.

14. The computer program product of claim 11, wherein the configuration parameters are utilized to determine whether the number of split-screens should be oriented in a portrait or landscape configuration.

15. The computer program product of claim 11, wherein establishing the plurality of application instances to be initialized is based on the number of split-screens and a maximum number of split-screens allowed by the native capacity of the application.

16. The computer program product of claim 15, wherein the number of application instances to be initialized is established by dividing the number of split screens by the maximum number of split-screens allowed by the native capacity of the application.

17. The computer program product of claim 11, wherein a virtual machine server is initialized for each application instance.

18. The computer program product of claim 11, wherein one virtual machine server is initialized for the plurality of application instances.

19. The computer program product of claim 11, wherein initializing the one or more virtual machine servers comprises configuring the virtual machine servers to communicate amongst each other and communicate with the client device.

20. The computer program product of claim 11, wherein optimizing display output parameters for each application instance comprises configuring display output parameters of each application instance to fit within a portion of the display on the client device.

21. A system for allowing a number of split-screens to share a display on a client device beyond an application's native capacity for split-screening, comprising:
   a data center comprising:
      hardware resources;
      a virtual machine monitor functionally connected to the hardware resources; and
      a virtual machine server functionally connected to the virtual machine monitor, wherein the virtual machine server executes a plurality of instances of the application;
   wherein the data center:
      optimizes the display output parameters of each application instance; and
      outputs the display from each application instance to the client device, such that the display output from each application instance shares the display on the client device.

22. The system of claim 21, wherein the hardware resources comprise a graphics processing unit and one or more central processing units.

23. The system of claim 21, wherein two or more virtual machine servers are functionally connected to the virtual machine monitor.

24. The system of claim 23, wherein each virtual machine server executes an application instance.

25. The system of claim 21, wherein the plurality of application instances are established based on the number of split-screens and a maximum number of split-screens allowed by the native capacity of the application.

26. The system of claim 21, wherein configuration parameters of the client device are utilized by the data center to determine how the number of split-screens shares the display at the client device.

27. The system of claim 21, wherein the configuration parameters are utilized to determine whether the number of split-screens should be oriented in a portrait or landscape configuration.

* * * * *